United States Patent
Dufort et al.

(10) Patent No.: US 10,625,292 B2
(45) Date of Patent: Apr. 21, 2020

(54) SYSTEM AND METHOD FOR FINISHING THE SURFACE OF THREE-DIMENSIONAL (3D) OBJECTS FORMED BY ADDITIVE MANUFACTURING SYSTEMS

(71) Applicant: Xerox Corporation, Norwalk, CT (US)

(72) Inventors: Ron E. Dufort, Rochester, NY (US); Linn C. Hoover, Webster, NY (US); Erwin Ruiz, Rochester, NY (US); Mandakini Kanungo, Penfield, NY (US)

(73) Assignee: Xerox Corporation, Norwalk, CT (US)

( * ) Notice: Subject to any disclaimer, the term of this patent is extended or adjusted under 35 U.S.C. 154(b) by 181 days.

(21) Appl. No.: 15/290,674

(22) Filed: Oct. 11, 2016

(65) Prior Publication Data

US 2018/0099300 A1    Apr. 12, 2018

(51) Int. Cl.
| | | |
|---|---|---|
| *B05B 12/12* | (2006.01) | |
| *B05D 1/02* | (2006.01) | |
| *B05D 1/18* | (2006.01) | |
| *B05D 3/06* | (2006.01) | |
| *B05C 13/00* | (2006.01) | |
| *B33Y 40/00* | (2020.01) | |
| *B29C 71/00* | (2006.01) | |

(Continued)

(52) U.S. Cl.
CPC ............ *B05C 13/00* (2013.01); *B29C 64/30* (2017.08); *B29C 71/0009* (2013.01); *B29C 71/04* (2013.01); *B33Y 40/00* (2014.12); *B05C 3/09* (2013.01); *B05D 1/02* (2013.01); *B05D 1/18* (2013.01); *B05D 3/067* (2013.01); *B05D 2201/00* (2013.01); *B29C 2035/0827* (2013.01)

(58) Field of Classification Search
CPC . B05D 1/02; B05D 3/067; B05D 1/18; B05D 2201/00; B33Y 50/00; B33Y 40/00; B05C 13/00; B05C 3/09; B29C 64/30; B29C 71/0009; B29C 71/04; B29C 2035/0827; B29C 35/0827
See application file for complete search history.

(56) References Cited

U.S. PATENT DOCUMENTS

| | | | | |
|---|---|---|---|---|
| 5,234,636 | A | * | 8/1993 | Hull ................. B05D 1/045 264/129 |
| 2003/0077396 | A1 | * | 4/2003 | LeCompte ........... B05C 3/09 427/430.1 |

(Continued)

FOREIGN PATENT DOCUMENTS

| | | | | |
|---|---|---|---|---|
| DE | 102007041489 A1 | * | 3/2009 | ......... B29C 70/24 |
| WO | WO-2016132670 A1 | * | 8/2016 | ......... B33Y 50/02 |

*Primary Examiner* — Gordon Baldwin
*Assistant Examiner* — Christina D McClure
(74) *Attorney, Agent, or Firm* — Maginot Moore & Beck LLP

(57) ABSTRACT

A system treats uneven surfaces of additive manufactured objects to improve the transparency and glossiness of the surfaces. The system operates a sprayer to apply fluid material used to form the uneven surface to the uneven surface to smooth the surface or the system operates an actuator to dip the additive manufactured object into a bath of fluid material that is the same as the material used to form the uneven surface to smooth the surface. A heater is provided to dry non-UV curable material applied to the uneven surface and a source of UV radiation is provided to cure UV curable material applied to the uneven surface.

9 Claims, 4 Drawing Sheets

(51) Int. Cl.
*B29C 64/30* (2017.01)
*B29C 71/04* (2006.01)
*B05C 3/09* (2006.01)
*B29C 35/08* (2006.01)

(56) References Cited

U.S. PATENT DOCUMENTS

| | | | |
|---|---|---|---|
| 2010/0104804 A1* | 4/2010 | Ito | C08L 63/00 428/141 |
| 2013/0189435 A1* | 7/2013 | Mackie | B29C 67/0055 427/256 |
| 2015/0014881 A1* | 1/2015 | Elsey | B29C 67/0059 264/219 |
| 2015/0197455 A1 | 7/2015 | Pranov | |
| 2015/0239148 A1* | 8/2015 | Israel | B33Y 10/00 264/40.3 |
| 2016/0298833 A1* | 10/2016 | Lin | F21V 3/00 |

\* cited by examiner

SYSTEM AND METHOD FOR FINISHING THE SURFACE OF THREE-DIMENSIONAL (3D) OBJECTS FORMED BY ADDITIVE MANUFACTURING SYSTEMS

TECHNICAL FIELD

This disclosure relates generally to objects formed by additive manufacturing systems, and more particularly, to systems for finishing the surface of such objects.

BACKGROUND

Some surfaces of parts formed by additive manufacturing systems are often not smooth and the surface roughness affects visual properties of the part such as its translucency, color, gloss, and the like. For example, a rough surface can make clear parts appear opaque, colors can be less vivid, and surface finish can be flat or matte. Typical three-dimensional object (3D) printing processes produce widely varying surface roughness in a single object. For example, a lack of registration between the movement of material ejectors and the platen on which the object is formed can result in small misalignments between the start and end of each layer. The printing process produces parts with vertical surfaces that are significantly rougher than the horizontal surfaces of the object because the ends of the layers do not align with one another. Thus, a part made with clear material drops from ejectors has vertical surfaces that appear opaque, while the horizontal surfaces appear clear. Other surfaces of the same object are within a range of translucencies between clear and opaque. Non-additive manufacturing processes, such as injection molding, are capable of producing parts that are clear with high gloss because the melted material conforms to the smooth polished surfaces of the mold. Thus, the vertical walls of the part are formed as smoothly as the horizontal surfaces of the part.

Currently, additive manufactured parts can be treated to give them a more uniform or enhanced appearance. Conventional subtractive finishing techniques, such as sanding, polishing, and buffing, are often used, however, these methods are time consuming, difficult to perform on complex object geometries, may damage small features, and remove thin color layers. Coatings are also used, such as glycerol dips or varnish, to enhance surface gloss and color vibrancy, but they often require subtractive finishing techniques, such as polishing or buffing, to prepare the surfaces for the coatings, can have lengthy processing or drying times, and can leave the part greasy to the touch. Additionally, the coatings can later detach or peel from the surfaces or they do not match the colors of images at or near the surfaces. Thus, a system that restores uneven surfaces of additive manufactured objects without the issues raised by subtractive finishing techniques or coatings would be desirable.

SUMMARY

A system that restores uneven surfaces of additive manufactured objects includes a housing, at least one of a sprayer connected to a source of fluid material that is configured to direct drops of the fluid material towards a surface of an additive manufactured object and an actuator configured to lower the additive manufactured object into a reservoir containing fluid material and to raise the additive manufactured object from the reservoir, the fluid material in the source of fluid material or the reservoir being a fluid material that is a same material as the surface of the additive manufactured article, and a controller operatively connected to the at least one of the sprayer and the actuator, the controller being configured to operate the actuator to lower the additive manufactured article into the fluid within the reservoir and to raise the additive manufactured object from the fluid in the reservoir or to operate the sprayer to direct drops of the fluid material onto the surface of the additive manufactured object to apply the fluid material to the surface of the additive manufacturing object and improve the transparency or glossiness of the additive manufactured object.

A method of treating the surfaces of additive manufactured objects includes positioning an additive manufactured object within a housing, operating with a controller an actuator to lower the additive manufactured article into a fluid material within a reservoir and to raise the additive manufactured object from the fluid material in the reservoir, or operating with the controller a sprayer operatively connected to a source of fluid material to direct drops of the fluid material onto the surface of the additive manufactured object to apply the fluid material to the surface of the additive manufacturing object and improve the transparency or glossiness of the additive manufactured object, the fluid material in the source of fluid material or the reservoir being a fluid material that is a same material forming the surface of the additive manufactured article.

BRIEF DESCRIPTION OF THE DRAWINGS

The foregoing aspects and other features of a system and method that treats the surfaces of additive manufactured objects to improve desirable visual properties are explained in the following description, taken in connection with the accompanying drawings.

DETAILED DESCRIPTION

Figure 1:
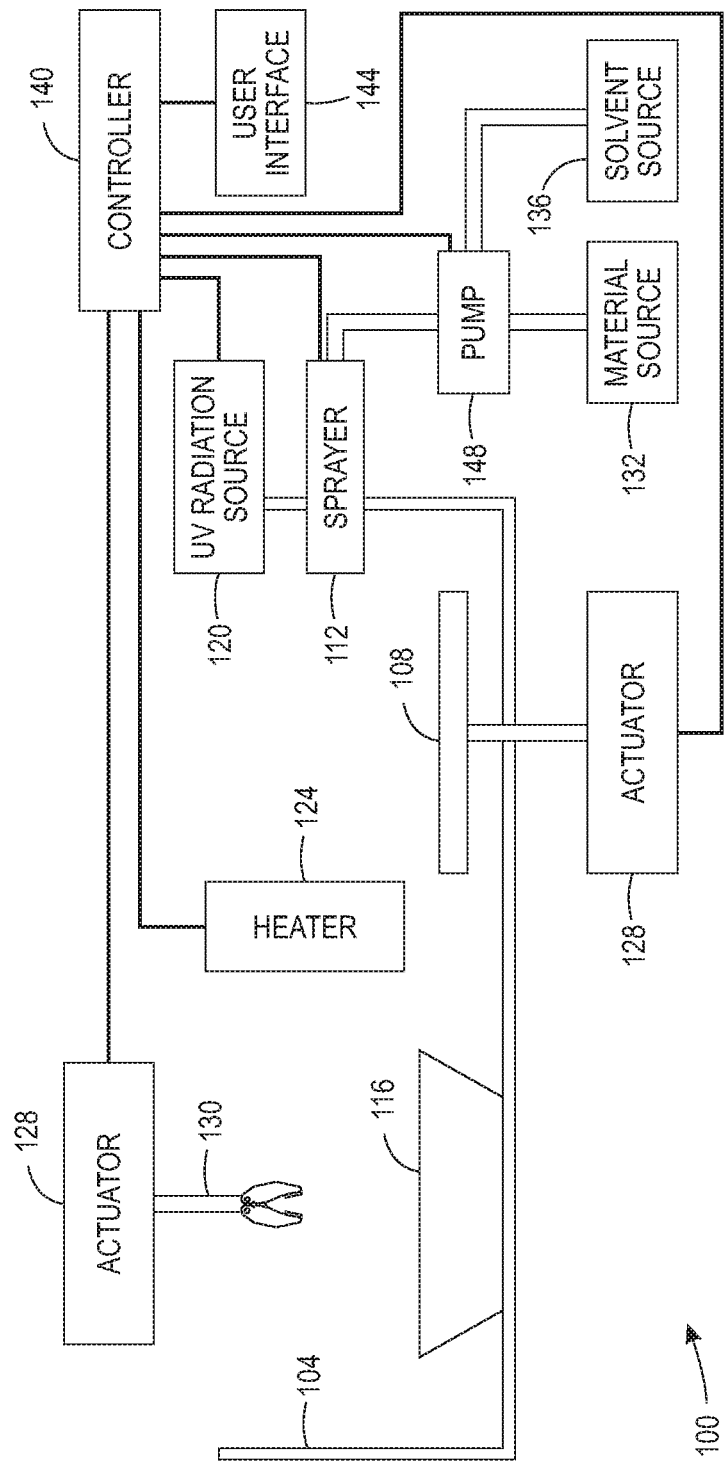
FIG. 1 is a block diagram of a system that treats the surfaces of additive manufactured objects to improve visual properties of the surfaces.

For a general understanding of the present embodiments, reference is made to the drawings. In the drawings, like reference numerals have been used throughout to designate like elements.

Figure 4:
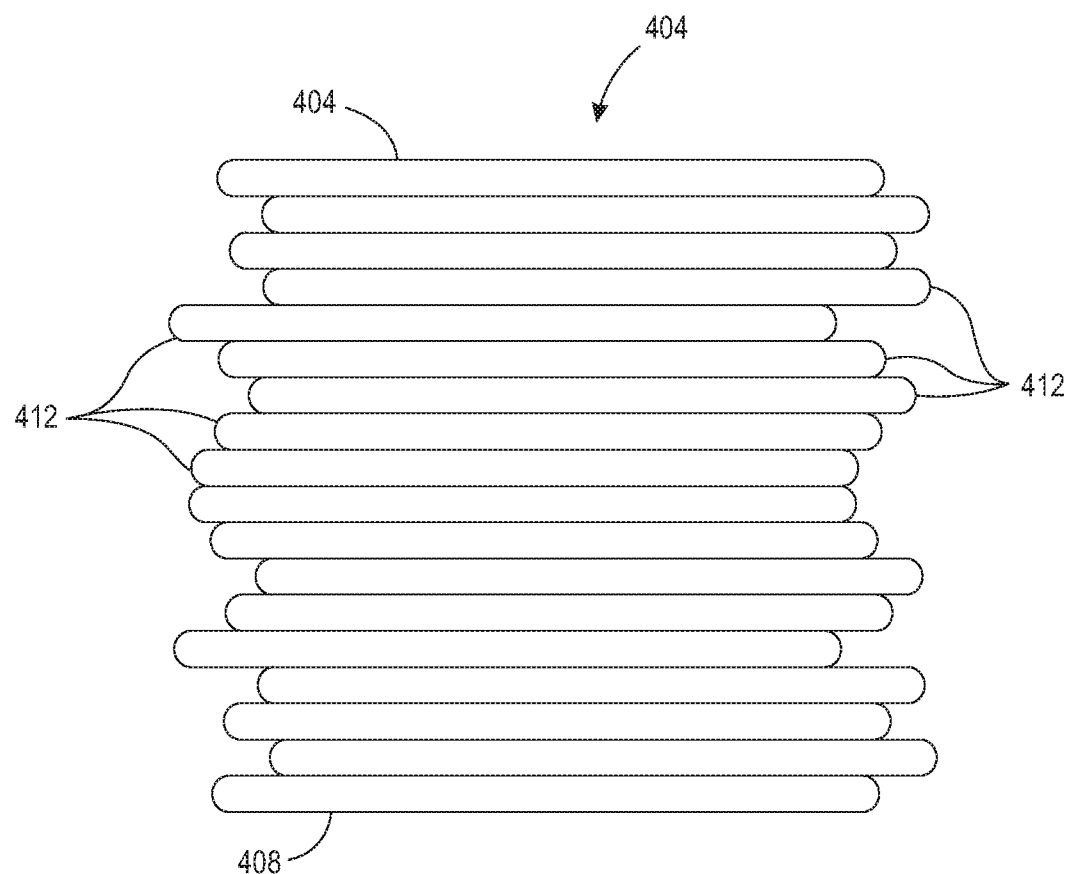
FIG. 4 illustrates the irregular registration of layers of a prior art additive manufactured object that degrades the visual properties of the object when viewed from the perspective of a side formed by the irregularly registered layers.

FIG. 4 depicts a side view of a prior art additive manufactured object 404, such as a tube. The object is formed with layers 408. As the stack grows vertically, from time to time, a planerizer levels the current topmost layer so subsequently formed layers are level. Although exaggerated in the figure, the registration of the ends 412 of the layers 408 is not exact. This uneven surface formed by the ends 412 scatters light striking the surface and this scattering renders the object opaque or at least translucent when viewed through the uneven surface. The actual variation of an end from the position where the end should be can be measured in tens of microns. Consequently, the overall unevenness of the surface is probably less than 100 µm. Previously known methods for addressing this effect include sanding, buffing, and polishing. These techniques, however, are time intensive and difficult to apply to features that have complex geometries. For objects formed with extruded ABS materials and the like, the object can be placed in a chamber having an acetone atmosphere so the acetone vapor can melt the exposed surfaces and smooth the surface. This technique, however, cannot be used with objects made with ultraviolet (UV) curable materials as acetone does not chemically react with the cured UV material.

A new system that renders the surfaces of objects glossy or transparent is shown in FIG. 1. The system 100 includes a housing 104, a source of fluid material, such as a sprayer 112 or a reservoir 116, a rotating support 108 within the housing 104, a heater 124, actuators 128, and a controller 140. The system 100 is depicted with both a sprayer 112 and a reservoir 116 to simplify the drawings and description of the system useful for restoring the gloss or transparency to additive manufactured objects, although some embodiments can be configured to have only one or the other. The controller 140 is operatively connected to the actuators 128, the sprayer 112, and to a user interface 144. An operator inputs data through the user interface 144 to identify whether the object is to be sprayed or dipped and whether the object is heated or subjected to UV radiation to bond the UV curable material to the object.

Figure 2:
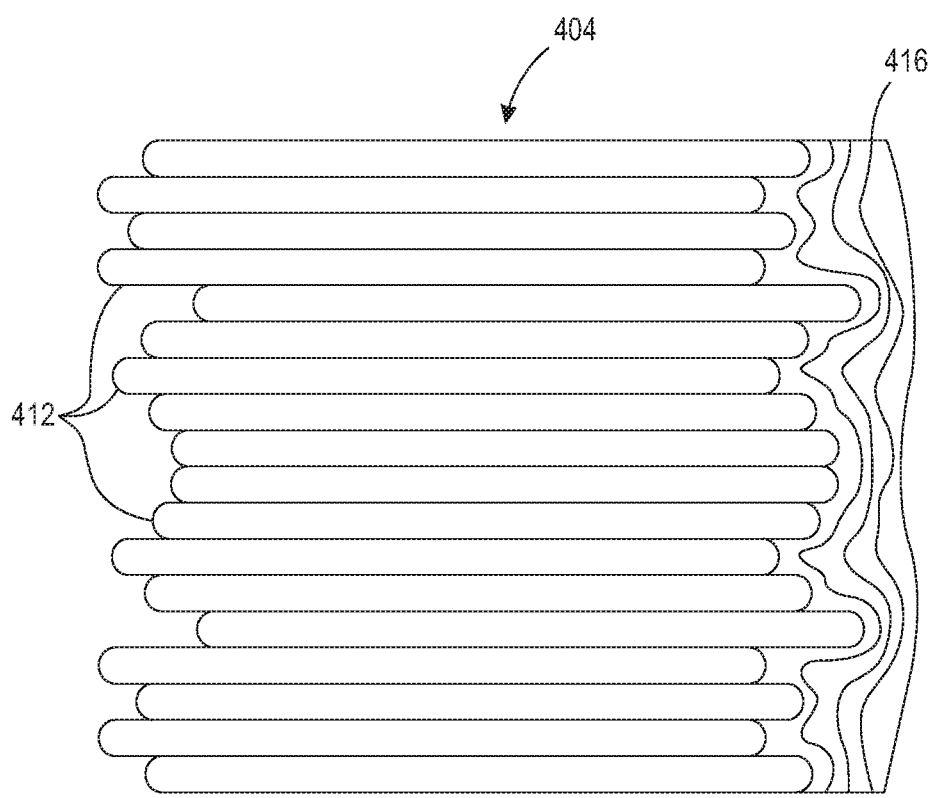
FIG. 2 depicts material that has bonded to an uneven surface of an additive manufactured object to improve the visual properties of the surface.

To rehabilitate an uneven surface of an additive manufactured object, the object is placed on the rotating support 108 or suspended from the member 130 extending from one of the actuators 128 and the operator enters data into the user interface 144 that identifies the treatment process and the type of material bonding to be used. If spraying is identified, the controller 140 operates the actuator 128 connected to the support 108 to rotate the support and the object as the controller operates the sprayer 112 to direct drops of fluid material towards the uneven surface of the object. The fluid material emitted by the sprayer 112 can be the same material forming the uneven surface being treated or another material compatible with the surface material. The drops fill the crevices in the uneven surface. If the fluid material is not identified as being UV curable, then the controller 140 operates the heater 124 to dry the fluid material on the object to bond the material filling the crevices to the uneven surface. An uneven surface of an object 404 filled with fluid material that has bonded to the object within the crevices of side 416 is shown in FIG. 2. Side 416 is smoother than the side formed by the ends 412 of the layers 408 in FIG. 4. This smoothness makes side 416 more transparent and glossy than the side of the object 404 shown in FIG. 4.

Using ejectors that formed the layers of the object rather than sprayer 112 to form the side 416 is not optimal because the ejectors are designed to eject drops of material having a diameter of 1 to 6 mm. The ejectors cannot direct the drops of material over long distances as accurately as the sprayer 112. The heater 124 is provided in some embodiments so the controller 140 can operate the heater to heat the applied fluid material and reduce the drying time for the material. For larger objects or objects having features with complex geometries that are difficult to reach with a spray, the operator uses the user interface 144 to identify dipping as the object treatment once the object is suspended from the member 130 extending from actuator 128. The controller 140 operates the actuator to lower the object into the reservoir 116 to dip the object into a bath of the fluid material that is the same as the fluid material forming the surface of the object or a material compatible with the surface of the object, and then lift the object from the reservoir. Once the object is raised, the controller 140 operates the heater 124 to reduce the drying time of the fluid material. To improve the ability of some fluid materials to enter the crevices of an uneven surface, the material sprayed by the sprayer 112, which was received from the fluid material source 132, is mixed with an appropriately compatible solvent from a thinning fluid source 136 to reduce the viscosity of the material. The controller 140 operates a pump and valve 148 to pull predetermined amounts of the material and the solvent from their respective sources to achieve this mixing.

The processes described above can be augmented by downloading data regarding the geometry of the part being treated so the controller 140 can be use this data to customize the finishing process. Specifically, the controller 140 uses this data to identify areas on the part where the build orientation produces greater surface roughness and then the controller operates the sprayer 112 to apply additional coating in those areas. By operating the sprayer to apply material to these select areas only, material is saved and part features are preserved. Another finishing option combines both dipping and spraying the part. In this option, the controller 140 uses the part geometry data to customize the finishing process by dipping the part to apply a general overcoat and then spraying select areas of the part that the controller identified as having greater surface roughness with reference to the part geometry data.

As noted above, the fluid material in the reservoir 116 or the fluid material sprayed by the sprayer 112 can be the same material used to form the uneven surface. Applying the same material to the part has the advantage of adhering to the uneven surface better than a dissimilar material. Additionally, applying the same material used to form the layers means the properties of the two materials, such as color, refractive index, elasticity, and hardness, match. These advantages are particularly important for objects formed with UV curable build material. By applying the same UV curable fluid material to the uneven surface and then curing the fluid material, the applied material bonds to the UV curable material within the crevices of the uneven surface. For embodiments used to make the surfaces of objects formed with UV curable material transparent or glossy, the system 100 also includes a UV radiation source 120. The UV source 120 can be operated after the sprayer 112 has been operated or the object submerged in the reservoir 116 to cure the UV fluid material applied to the object. When the sprayer is used to apply the fluid material, the UV source 120 can be operated to cure a layer of applied material, then another layer can be applied by the sprayer and subsequently cured by the UV source. After the curing of each layer, the transparency or gloss of the object can be evaluated to determine whether another layer of fluid material is required. For most objects, the gloss or transparency of an uneven surface of an additive manufactured object is significantly improved after the application of one to four sprayed layers.

Figure 3:
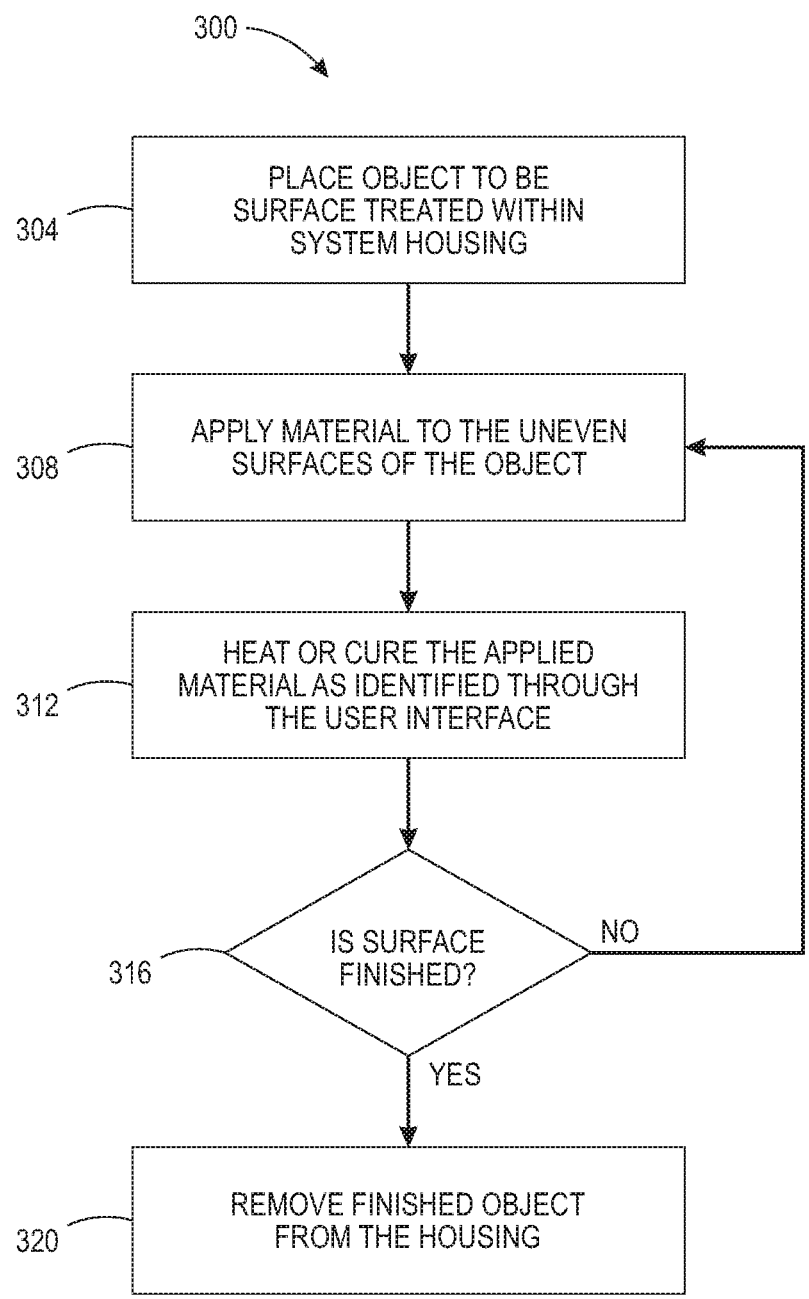
FIG. 3 depicts a process that treats the surfaces of additive manufactured objects to improve visual properties of the surfaces.

A process for smoothing uneven surfaces of additive manufactured objects to improve the transparency and glossiness of the surface is shown in FIG. 3. The process 300 begins with placement of an additive manufactured object from which support material has been removed within a housing (block 304). A fluid material applicator is operated to apply material onto the uneven surfaces of the object (block 308). The applicator is either the sprayer described above or the lowering of the object into the reservoir 116. The applied fluid material is then heated or cured (block 312), depending upon the type of material applied to the object, to adhere the applied material to the uneven surface. The finish of the surface is evaluated (block 316) and, if it does not meet or exceed a predetermined level of transparency or glossiness, another layer of fluid material is applied to the uneven surface (308) and dried or cured (block 312). The process continues until the predetermined level of transparency or glossiness is met or exceeded (block 316). At that time, the object is removed from the housing (block 320).

In most embodiments of the system and method described above, the fluid material used to treat the uneven surfaces is clear. By using a clear material, the color of the uneven surface does not have to be matched. For some colored surfaces, the applied material is the same material used to form the surface of the object since color matching should not be an issue in that situation.

It will be appreciated that variations of the above-disclosed apparatus and other features, and functions, or alternatives thereof, may be desirably combined into many other different systems or applications. Various presently unforeseen or unanticipated alternatives, modifications, variations, or improvements therein may be subsequently made by those skilled in the art, which are also intended to be encompassed by the following claims.

What is claimed is:

1. A method for treating surfaces of additive manufactured objects comprising:
   positioning an additive manufactured object within a housing;
   receiving with a controller data from a user interface that identifies a treatment process and a type of material bonding for the additive manufactured object within the housing;
   operating with the controller an actuator to lower the additive manufactured object into a first fluid material within a reservoir and to raise the additive manufactured object from the first fluid material in the reservoir after the additive manufactured object has been lowered within the reservoir;
   operating with the controller one of a heater and a UV radiation device to bond the first fluid material applied to the additive manufactured object and form a coating on the additive manufactured object;
   downloading additive manufactured object geometry data to the controller;
   identifying with the controller at least one surface of the additive manufactured object that has a surface roughness greater than a surface roughness of another surface of the additive manufactured object, the identification of the surface being made with reference to the additive manufactured object geometry data downloaded to the controller;
   operating with the controller a sprayer operatively connected to a source of a second fluid material to direct drops of the second fluid material onto the coating of the identified at least one surface of the additive manufactured object; and
   operating with the controller one of the heater and the UV radiation device to bond the drops of the second fluid material directed by the sprayer to the coating on the identified at least one surface of the additive manufactured object.

2. The surface treating method of claim 1 further comprising:
   operating with the controller an actuator operatively connected to a support to place the additive manufactured object opposite the sprayer and to rotate the support and the additive manufactured object on the support as the controller operates the sprayer to direct the drops of the second fluid material onto the coating on the identified at least one surface of the additive manufactured object.

3. The surface treating method of claim 1 further comprising:
   operating with the controller a pump operatively connected between a source of solvent and the sprayer to mix solvent with the second fluid material delivered to the sprayer to decrease a viscosity of the second fluid material directed onto the coating on the identified at least one surface of the additive manufactured object by the sprayer.

4. The method of claim 1 wherein the second fluid material is different than the first fluid material.

5. The method of claim 4 wherein the controller operates the UV radiation device to bond the first fluid material applied to the additive manufactured object from the reservoir to the additive manufactured object and operates the heater to bond the drops of the second fluid material to the coating.

6. The method of claim 4 wherein the controller operates the heater to bond the first fluid material applied to the additive manufactured object from the reservoir to the additive manufactured object and operates the UV radiation device to bond the drops of the second fluid material to the coating.

7. The method of claim 1 wherein the first fluid material and the second fluid material are a same fluid material.

8. The method of claim 7 wherein the controller operates the UV radiation device to bond the first fluid material applied to the additive manufactured object from the reservoir to the additive manufactured object and to bond the drops of the second fluid material to the coating.

9. The method of claim 7 wherein the controller operates the heater to bond the first fluid material applied to the additive manufactured object from the reservoir to the additive manufactured object and to bond the drops of the second fluid material to the coating.

* * * * *